FIG. 16
FIG. 17
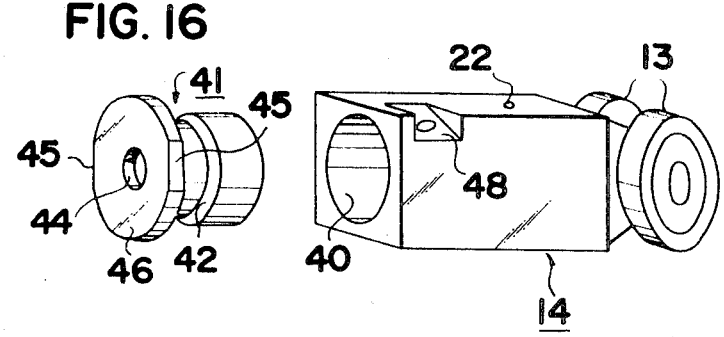
FIG. 18
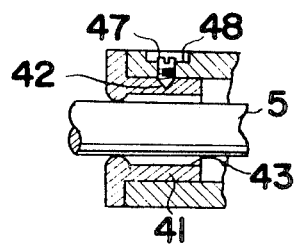

3,611,646
APPARATUS FOR SUPPORTING THE PULLEY
OF THE BELT GRINDER
William M. Cameron, Tadao Tanoi, Kyoich Hirokawa,
and Yoshio Aoki, Tokyo, Japan, assignors to Nitto
Kohki Company Limited, Tokyo, Japan
Filed Oct. 23, 1969, Ser. No. 868,685
Claims priority, application Japan, Nov. 2, 1968,
43/95,285; Nov. 4, 1968, 43/80,559; Feb. 4,
1969, 44/9,358; Feb. 5, 1969, 44/9,797; Feb.
18, 1969, 44/13,509; Feb. 19, 1969, 44/14,020
Int. Cl. B24b 23/00, 21/00, 23/06
U.S. Cl. 51—170                              10 Claims

ABSTRACT OF THE DISCLOSURE

The present invention relates to a support for a pulley and more particularly to a support for a pulley of the belt grinder, the attachment angle of which is freely controlled and the tension of the grinding belt can be kept uniform.

---

In the prior belt grinder, grinding was conducted by driving an endless grinding belt at high speed around the driving roller and the pulley. But the defects of the prior belt grinders were the length of belt on both sides differed due to the descrepancy of circumference on both sides. This was the case not only in cloth or paper sand belts but also in the cases of cloth and leather belts for finishing polish. Moreover, the supporting body was sometimes attached to the end of the arm of the grinder twistedly. Therefore, it was necessary to strictly choose the belts and to pay constant attention to the condition of the belts in order to prevent the belt from slipping off from the roller and harming the surface and stopping the operation.

The object of the present invention is to provide a support for the pulley of the grinding belt in which it is possible to control the attachment and of the pulley with respect to driving roller, by a fine adjustment of the attachment angle of the supporting body provided at the end of the arm with respect to the said arm. The further object of the present invention is to provide a support means for a pulley by which a tension is given in order to prevent the grinding belt from slipping and to assure the high speed running of the belt.

Still a further object of the present invention is to provide a support means for a pulley of the grinder in which the exchange of the grinding belt is facilitated with ease.

The other objects of the present invention will be clear from the detailed description made in connection with the attached drawings.

The drawings show the preferred embodiments of the support means for pulley in the present invention in which:

FIG. 16 is an oblique view of the flanged drum inserted into the supporting means;

FIG. 17 is an oblique view of the supporting means shown in FIG. 15; and

FIG. 18 is a partially fragmental view of FIG. 15.

DESCRIPTION OF THE PROPOSED EMBODIMENT

This invention relates to an apparatus for supporting the pulley of a belt grinder comprising an arm attached removably to the armholder extending from the main body of the belt grinder with a spring between them, a stopper keeping the said arm at a determined position against the resilient force of the spring which is provided if necessary, and a supporting body for the pulley with a hole on the barrel to insert the end of arm, and provided with a supporting arm at the top portion to support the pulley rotatably.

The supporting means is inserted and pinned into the hole which is formed to be bigger than the axis of the arm in diameter at the end portion of the arm. Accordingly, the supporting means are movable horizontally as well as vertically with respect to the arm. A screw is provided at the barrel of supporting means or on the side of the arm. The above mentioned various objects are attained by controlling this screw.

Figure 1:
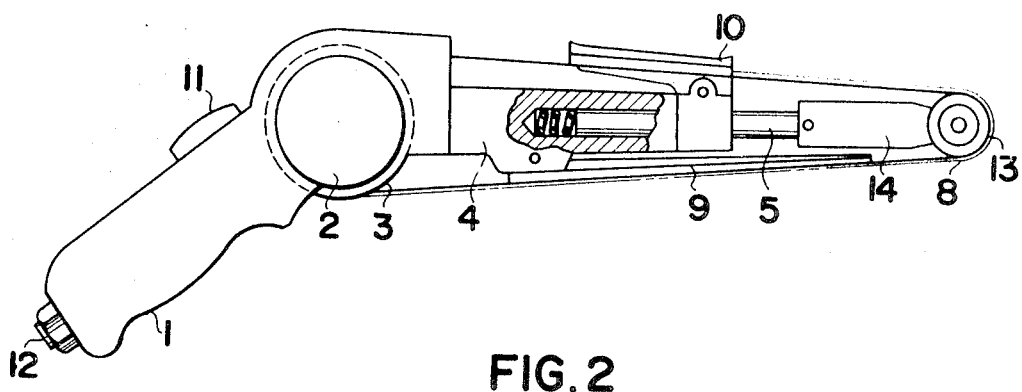
FIG. 1 is the partially fragmental side view of the belt grinder.
Figure 2:
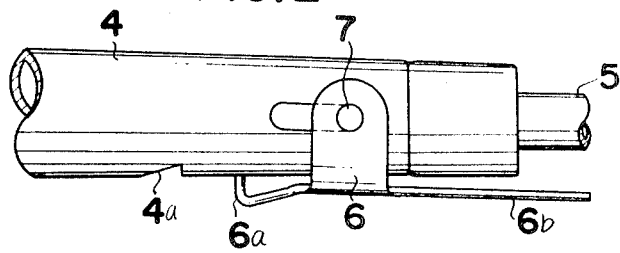
FIG. 2 is the partial bottom view showing; the condition in which a stopper adjusting the forward and backward movement of the arms as attached to the armholder of the FIG. 1.
Figure 3:
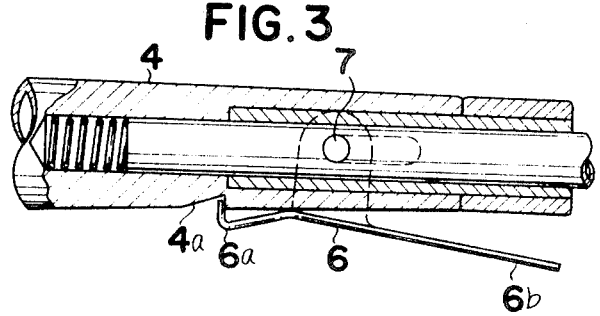
FIG. 3 is the bottom view of the armholder exploded along the longitudinal direction thereof.

FIG. 1 shows the whole body of the belt grinder, a portion of which is exploded to show the attachment of the arm to the armholder.

The main body 2 of the grinder having a handle 1 is provided with an airmotor therein. A driving roller 3 is rotatably fixed to the rotary shaft (not shown) of the said air motor. A spring is inserted into the hole at the center of the shaft of the armholder 4 extending from the main body 2, with one end of the arm 5 being inserted movably forward and backward.

Stopper 6 is mounted on the top portion of the projection 7 on the both side walls of the arm 5, which moves forward and backward accompanying the movement of the said arm. The pawl 6a of the said stopper is connected to the scooped portion 4a of the armholder 4 of the main body 2 to maintain the forward movement of the arm 5, when the arm 5 is moved backward to exchange the grinding belt 8 by decreasing the tension of the said belt.

When it is necessary to regain the tension of the grinding belt, the pawl 6a can be released by pushing the open end 6b of the stopper 6.

9 is the press plate for the belt, 10 is the manual press plate, 11 is a plate for opening and closing the air valve and 12 is the inlet port for air.

Air motor is used in the above embodiment, but electric motor can also be used effectively.

Figure 4:
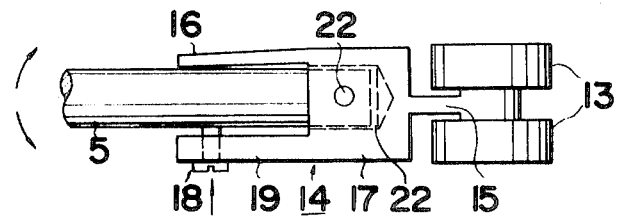
FIG. 4 is an enlarged plan view of the support means for the pulley attached to the end of the arm.

FIG. 4 shows the supporting means for the pulley. The subordinate roller 13 is rotatably supported by the supporting arm 15 formed at the top portion of the supporting means 14. The barrel of the said supporting means is provided with two legs 16, 17 extending on both sides of the arm 5, one of the said legs 16 being not parallel to the other 17 and reaching to the side wall of the arm 5. This leg 16 functions as resilient pressing plate to the other leg 17. The end portion of the other leg 17 forms an attachment plate 19 for the adjusting screw 18, which is contacted with the side wall of the arm 5.

The barrel 20 of the supporting means is provided with a hole 21 for inserting arm, the diameter of which is larger than the axis of the arm. Accordingly, the arm 5 extends between two legs, that is, the said resilient pressing plate and the plate for attaching the screw, the end of the arm being inserted and pinned into the hole of the supporting means (see FIG. 4). The pin 22 connects vertically the supporting means and the end portion of the arm with respect to the rotary shaft of the pulley 13. Accordingly, the top portion of the supporting body can revolve freely in the direction of revolving axis of the pulley, namely in the horizontal direction in the figure.

But the revolution is limited to a certain range by the arm 5 extending between the plate 19 for attaching a screw and the resilient pressing plate 16 provided at the back portion of the supporting means 14. The attachment angle of the supporting means 14 to the arm 5 is controlled by turning the screw 18 provided at the end portion of the mounting plate 19.

Figure 5:
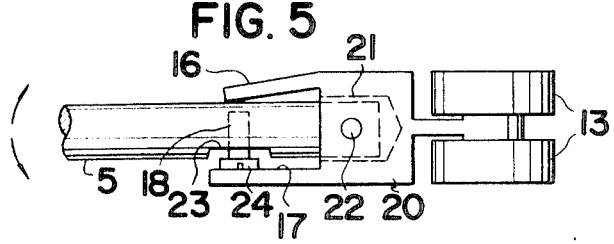
FIG. 5 is an enlarged plan view of the support means for the pulley in a variation of FIG. 4.
Figure 6:
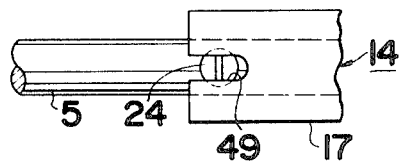
FIG. 6 is the partial side view of the FIG. 5.

In this invention, the position to mount the adjusting screw 18 is not limited to one leg of the supporting means, but it can be provided hidden in the side wall of the arm 5 as shown in FIG. 5. In FIG. 5, the adjusting screw 18 is mounted on the plane portion 23 provided on the outside wall of the arm approximately in the vertical direction of the arm. The top portion 24 of the adjusting screw is contacted with the one leg 17 of the supporting means.

The top portion of the supporting means can be moved in the horizontal direction with respect to the arm, by turning the said screw to generate pressing force and making use of the resilient force of the other leg 16. A deep hole 49 is provided at the one leg 17 of the supporting means to facilitate the horizontal movement of the said body with ease by turning the said screw 18.

As an alternative, two screws can be mounted on the opposing sides of the supporting means, the arm being between them, in order to move the top portion of the supporting means horizontally with respect to the arm.

Figure 7:
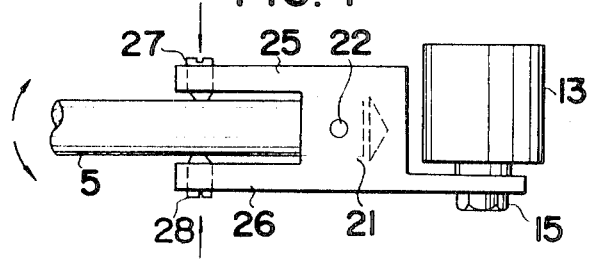
FIG. 7 is one variation of the support pulley for the pulley as shown in FIGS. 4 and 5.

In FIG. 7, the pulley 13 is rotatably supported by the supporting arm 15 formed at the end of the supporting means 14. Legs 25 and 26 are spaced at an adequate interval on both sides of the said supporting means. Screws 27 and 28 are mounted at the end of the both legs. A sack shaped hole 21 for inserting arm larger than the axis of the arm in diameter is bored between the two legs. The end of the arm is inserted into the said hole and supported by a pin 22. Both legs and the arm are tightly combined by turning the screws 27 and 28 provided at the legs 25 and 26 and the supporting body is moved horizontally with respect to the arm.

In FIG. 7, legs are shown as extending from the barrel of the supporting means, but it is not necessarily required to provide these legs. As an alternative, an adjusting screw can be attached to the barrel of the supporting means.

Figure 8:
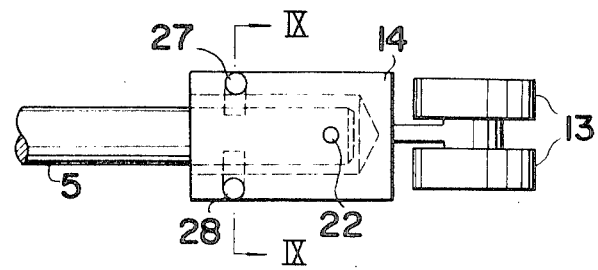
FIG. 8 is a plan view showing a variation of FIG. 7.

Instead of using such pulley 13 comprising two wheels as shown in FIG. 4, a roller 13' as shown in FIG. 7 can be used. In the above embodiments, the adjusting screw is provided in such a condition that it may reach to the shaft core of the arm, or may be hidden in it. But it is also possible to provide the adjusting screw at such position as to be eccentric with respect to the shaft core. This embodiment is shown in FIGS. 8 and 9.

Figure 9:
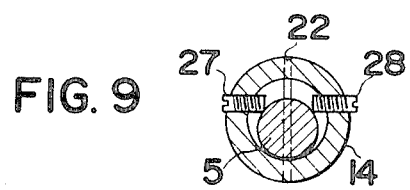
FIG. 9 is a longitudinal sectional view of FIG. 8 along the line IX—IX.

Two screws 27 and 28 provided at the opposite sides of the barrel of the supporting body is placed at a position slightly upper than the shaft core of the arm, as shown in FIG. 9. In this case, the arm is securely supported at three positions, that is, the ends of the adjusting screws 27 and 28 provided at the side of supporting means 14 and the inside wall of the supporting means 14. Accordingly, the horizontal movement of the supporting body can be effectively controlled. Moreover, the arm 5 and the supporting means 14 having the subordinate roller do not slide aside to each other, even if strong vibration arises during the grinding operation by driving the grinding belt 8 with high speed.

Figure 10:
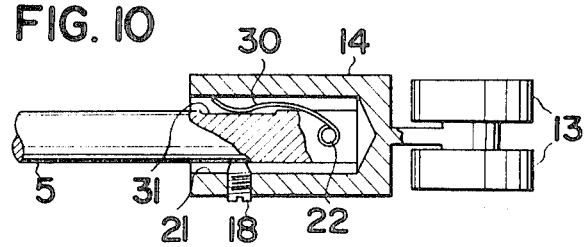
FIG. 10 is an enlarged partially fragmental plan view of the supporting means for the pulley, which is another variation of FIGS. 4 and 7.
Figure 11:
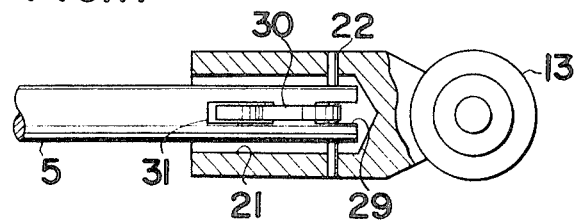
FIG. 11 is the side view of FIG. 10, exploded at one portion thereof.

In the following embodiment, the resilient pressing plate is provided at the arm, instead of one formed on the barrel of the supporting body. See FIGS. 10, 11 and 12. One end of a resilient flat spring 30 is supported by a pin 22 extending through the hollow portion 29 formed at the end of the arm 5. The other end of the said flat spring 30 is situated between the inside wall of the hole 21 and the arm 5. The projecting portion of the said flat spring 30 is contacted with the flat portion 31 formed on the outer surface of the arm 5. The end of the adjusting screw 18 inserted into the side wall of the supporting body is contacted with the arm 5.

Figure 12:
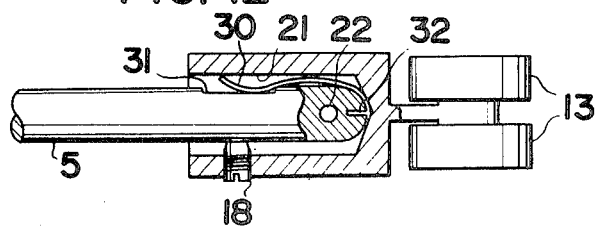
FIG. 12 is an enlarged partially fragmental plan view of the supporting means for the pulley, showing a variation of FIG. 10.

In FIG. 12, the end of the flat spring 30 is inserted into the slot 32 formed at the end of the arm 5.

Figure 13:
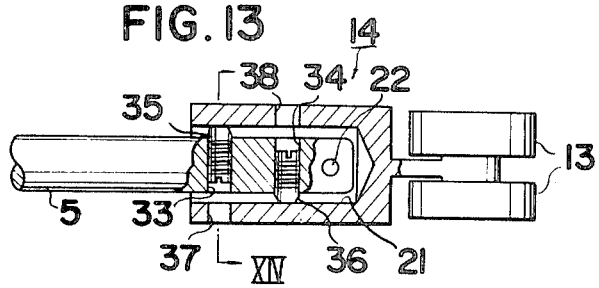
FIG. 13 is an enlarged partially fragmental plan view showing another variation of the supporting means for the pulley.
Figure 14:
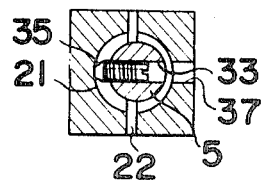
FIG. 14 is a sectional view along the line XIV—XIV of FIG. 13.
Figure 15:
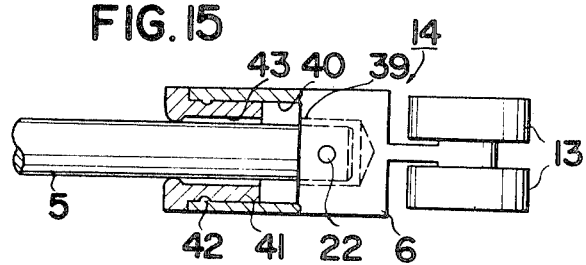
FIG. 15 is a partially fragmental plan view of the supporting means for the pulley, showing another embodiment of the present invention.

In FIG. 13, two adjusting screws are used instead of the flat spring. The use of two screws has been explained in FIGS. 7 and 8, but the embodiment in FIG. 13 is characterized by the point that the two screws are spaced in a certain interval in the arm in the longitudinal direction. This arm is provided with two adjusting screws 35 and 36 placed on the opposing sides in the hole bored vertically with respect to the longitudinal direction. Through holes 37 and 38 are formed at such position as to fit the said hole 34 and 33 on the side of the supporting means 14. In this embodiment, the adjusting screws 35 and 36 inserted into the holes 33 and 34 of the arm 5 are turned by a screwdriver or the like inserted through the through holes 37 and 38 of the supporting means 14. Therefore, there is no obstacle to prevent the operation on the outer side of the supporting body. Moreover, the supporting body does not slide off the determined position due to the adjusting screw 35 and 36 projecting on both sides of the arm, by which the said arm is kept at the determined position. Further, a fine control can be conducted in this invention.

Instead of using adjusting screws, flat spring and the like, it is possible to place some adjusting material between the inside wall of the hole for inserting the said arm formed on the supporting body and the outside wall of the arm. This embodiment is explained in FIGS. 15 to 18. A small hole 39 and a large hole 2 having slightly larger diameters than that of the arm are formed in a series inside the supporting means 14. The end of the arm 5 is inserted into the small hole 39. And the arm is connected to it with a pin 22 in such a way that it can be slid in the horizontal direction in the limited space of the large hole 40. Further, the arm 5 is slidable in the direction of the shaft core in the limited space of the small hole 39. V-shaped slot 42 is formed on the outer surface of the flange drum 41 to be inserted into the large hole 40. A hole 43 is formed inside the flange drum 41. An eccentric operation hole 44 is formed inside the one end of the said hole 43 on the flanged side. This operation hole 44 having the same diameter as that of the arm is closely contacted with the arm.

Spanner or the like is put into the flat portion 45 formed at the flange portion of the flange drum in order to turn the same drum. The screw 47 is put into the flat portion 48 formed at a comparatively thick part of the supporting means, for instance, at the corner. The center of the said screw is connected with the V-shaped slot 41 of the flange drum. It functions as guide to turn the flange drum 41, fixed to the supporting means.

In operation the screw 47 is loosened to be turned, the flange drum 11 being turned with spanner or the like, the position of the operation hole formed inside of the said drum being changed, and thus the attachment angle of the supporting body 14 is controlled.

When the attachment angle of the supporting body 14 is controlled, the arm 5 can be freely moved by a pin 2 in the horizontal direction. But it is impossible to turn the flange drum 41 having the operation hole 44, only by moving the said arm in the horizontal direction. The said drum 41 inserted into the large hole 40 of the supporting body 14 can be freely turned by making the arm 5 slidable in the longitudinal direction. Moreover, the flange drum can be fixed at any intended position of the supporting body by the arm. Further, the arm functions as guide to turn the said drum.

What is claimed is:

1. In a belt grinder having a main body and an arm holder extending therefrom, apparatus for supporting a pulley comprising:

an arm removably attached to said arm holder;
spring means interposed between said arm and arm holder and biasing said arm away from said main body;
pulley support means such that said supporting means able about an axis, said pulley support means having a barrel portion with a bore therein for receiving said arm, the inner diameter of said bore being larger than the outer diameter of said arm;
means pinning the end of the arm received in said bore to said pulley support means in the vertical direction with respect to the revolving axis of said pulley; and
means further resiliently coupling said arm to said pulley support means such that said supporting means is resiliently movable relative to said arm substantially in the direction of the revolving axis of said pulley.

2. Apparatus according to claim 1 wherein the barrel portion of said pulley support means has two legs extending on either side of said arm, one of said legs being at an angle relative to the other, said one leg contacting an outer surface of said arm and resiliently pressing against said arm.

3. Apparatus according to claim 2 wherein said other leg comprises an adjusting screw threadably engaged in said other leg for contacting the outer surface of said arm.

4. Apparatus according to claim 2 wherein said other leg has a recess therein and wherein said arm is provided with an adjusting screw threadably engaged in said arm at a position in registration with said recess.

5. Apparatus according to claim 1 comprising first and second adjusting screws on respective opposing sides of the barrel of said pulley supporting means, said screws respectively contacting each side of said arm.

6. Apparatus according to claim 5 wherein said first and second adjusting screws are attached to said barrel at respective positions eccentric from the central longitudinal axis of said arm.

7. Apparatus according to claim 1 including an elongated spring coupled to the end of said arm and contacting the inner wall of said bore in said barrel portion, and an adjusting screw threadably engaged in said barrel portion and contacting the side wall of said arm on the side of said arm opposite to the side that said elongated spring is secured to.

8. Apparatus according to claim 7 wherein said elongated spring is a flat spring.

9. Apparatus according to claim 1 wherein said arm includes two threaded bores therein spaced from each other in the longitudinal direction of said arm, and including two adjusting screws threadably engaged in respective threaded bores, the ends of said screws contacting opposite inner surfaces of said barrel, said barrel having access bores therein in registration with said screws and in portions thereof opposite to the portion where said screws contact said barrel, said screws being adjusted through said access bores.

10. Apparatus according to claim 1 wherein said bore in said barrel hole includes a number of large and small diameter bore portions, said pulley support means being pinned to the end of said arm at a small bore portion, and comprising a flange barrel, having an eccentric through hole and a slot on the outer wall thereof, movably inserted into a large bore portion of the barrel of said pulley support means, and screws engaged with the barrel of said pulley support means coupled to said slot on the outer wall of said flange barrel.

References Cited

UNITED STATES PATENTS

| | | | |
|---|---|---|---|
| 3,449,868 | 6/1969 | Leveque | 51—141 |
| 1,773,077 | 8/1930 | Newman | 51—170.4 UX |
| 1,969,318 | 8/1934 | Myers | 51—170.4 |

FOREIGN PATENTS

| | | | |
|---|---|---|---|
| 823,199 | 11/1959 | Great Britain | 51—170.4 |

JAMES L. JONES, Jr., Primary Examiner

U.S. Cl. X.R.

51—148